(12) United States Patent
Kuroiwa et al.

(10) Patent No.: US 6,511,625 B1
(45) Date of Patent: Jan. 28, 2003

(54) TRANSVERSELY STRETCHED NONWOVEN FABRIC WITH HIGH TENSILE STRENGTH STRETCHED SEVEN TIMES WIDER OR MORE IN TRANSVERSE DIRECTION

(75) Inventors: Yuki Kuroiwa, Saitama (JP); Yoshiro Morino, Chiba (JP); Kazuhiko Kurihara, Tokyo (JP); Shuichi Murakami, Tokyo (JP)

(73) Assignees: Nippon Petrochemicals Co., Ltd., Tokyo (JP); Polymer Processing Research Institute Ltd., Tokyo (JP)

( * ) Notice: Subject to any disclaimer, the term of this patent is extended or adjusted under 35 U.S.C. 154(b) by 142 days.

(21) Appl. No.: 09/644,778

(22) Filed: Aug. 23, 2000

(30) Foreign Application Priority Data

Aug. 24, 1999 (JP) ............................................. 11-236930

(51) Int. Cl.[7] ............................................... B29C 55/08
(52) U.S. Cl. ................................... 264/288.8; 264/290.2
(58) Field of Search ........................... 264/210.7, 288.8, 264/290.2

(56) References Cited

U.S. PATENT DOCUMENTS

| 4,223,059 A | 9/1980 | Schwarz |
| 4,774,770 A | 10/1988 | Langer et al. |
| 4,992,124 A | 2/1991 | Kurihara et al. |

FOREIGN PATENT DOCUMENTS

| DE | 3621 205 A1 | 1/1988 |
| GB | 1213441 A | 11/1970 |
| JP | 59-32307 B2 | 8/1984 |
| JP | 63-3068 B2 | 1/1988 |
| JP | 3-36948 B2 | 6/1991 |
| JP | 7-6126 B2 | 1/1995 |
| JP | 2612203 B2 | 2/1997 |
| WO | WO96/17121 A1 | 6/1996 |

*Primary Examiner*—Leo B. Tentoni
(74) *Attorney, Agent, or Firm*—Knobbe, Martens, Olson & Bear LLP

(57) ABSTRACT

A transversely stretched nonwoven fabric is manufactured by transversely stretching a nonwoven fabric. First, an original web comprising a plurality of un-oriented filaments is heated to a temperature higher than its stretch suitable temperature by 5° C. or more. Next, the heated original web is stretched at a rate of 1.2 to 3 in its transverse direction to stretch the filaments of the original web with almost no molecular orientation involved. Then, the original web stretched transversely at a rate of 1.2 to 3 is heated to the stretch suitable temperature and the original web is further stretched transversely at the stretch suitable temperature. With these steps, a transversely stretched nonwoven fabric in which the original web is stretched transversely at a rate of 7 times or more in total as compared with the state of the stretch thereof is manufactured with a high tensile strength of 132.5 mN/tex (1.5 g/d) in the transverse direction.

5 Claims, 5 Drawing Sheets

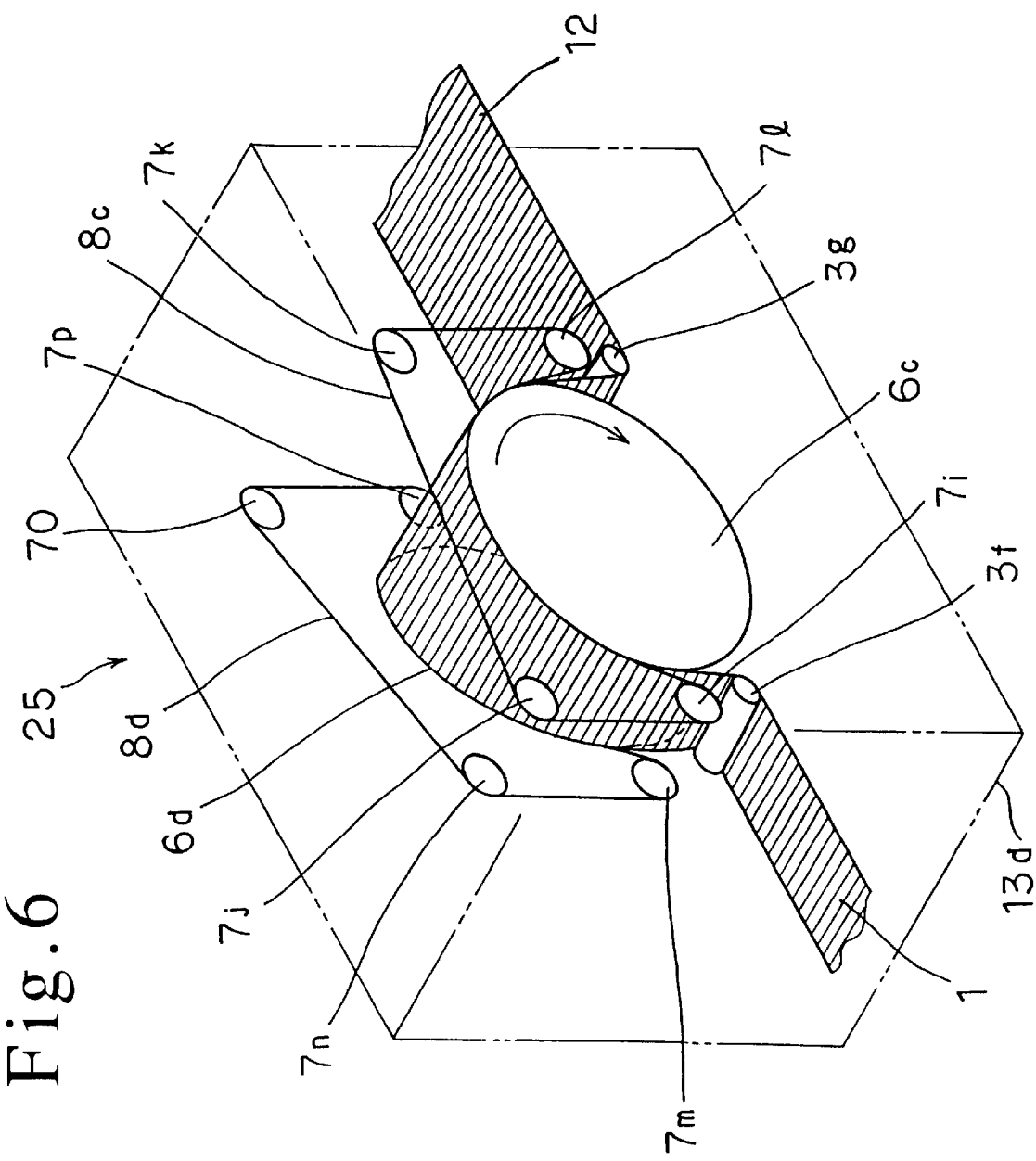

TRANSVERSELY STRETCHED NONWOVEN FABRIC WITH HIGH TENSILE STRENGTH STRETCHED SEVEN TIMES WIDER OR MORE IN TRANSVERSE DIRECTION

BACKGROUND OF THE INVENTION

1. Field of the Invention

The present invention relates to a transversely stretched nonwoven fabric of large width manufactured with transverse stretch of stretching a web in its transverse direction as one of so-called post stretch methods for nonwoven fabrics in which a web formed from spun filaments is stretched in manufacturing a nonwoven fabric. The transversely stretched nonwoven fabric is used as a nonwoven fabric requiring strength in a transverse direction and as a material web for an orthogonal nonwoven fabric, or as a nonwoven fabric with strength and dimensional stability.

2. Description of the Related Art

Methods of manufacturing nonwoven fabrics include a spun-bonding scheme, a melt blow scheme, a spun lace scheme which form a nonwoven fabric directly from spinning of a melting material resin, and the like. These schemes are dominant in the nonwoven fabric manufacturing methods in terms of economics and manufacturablility. Nonwoven fabrics manufactured with these schemes are hereinafter referred to as spun bonded nonwoven fabrics in a broad sense. The spun bonded nonwoven fabrics in a broad sense with the prior art are random nonwoven fabrics which have disadvantages that strength is low and they often have no dimensional stability.

Methods and apparatuses for manufacturing nonwoven fabrics which improve the aforementioned disadvantages are described in Japanese Patent Publication No. 36948/91, Japanese Patent Publication No. 6126/95 and Japanese Patent No. 2612203 by the present applicant.

Japanese Patent Publication No. 36948/91 describes, as a method of manufacturing a nonwoven fabric, a method of stretching a long fiber nonwoven fabric formed by spinning un-oriented filaments in one direction at a stretch suitable temperature such that many of the filaments are aligned in one direction. The gazette describes a method of laminating and bonding nonwoven fabrics stretched in such a method such that the respective stretch directions of the nonwoven fabrics are orthogonal to each other.

In addition, the aforementioned gazette describes, as spray spinning, a method of manufacturing a long fiber nonwoven fabric comprising un-oriented filaments aligned in one direction. In the method of manufacturing a long fiber nonwoven fabric, first, filaments pushed out from a nozzle are scattered by heated air which rotates in a spiral over a screen mesh running in one direction. Besides the rotating air, two flows of air are jetted such that they collide with each other below the nozzle. The air spread by the colliding two flows of air further scatters the rotating spun filaments. When the directions of the two flows of air jetted such that they collide with each other are parallel to the running direction of the screen mesh, the spun filaments are scattered in a direction perpendicular to the running direction of the screen mesh. This causes the scattered filaments to be accumulated on the screen mesh with many of the components being aligned transversely, thereby manufacturing a nonwoven fabric with the filaments mainly aligned transversely. On the other hand, when the directions of the two flows of air jetted such that they collide with each other are substantially orthogonal to the running direction of the screen mesh, the spun filaments are scattered in a direction parallel to the running direction of the screen mesh. This causes the scattered filaments to be accumulated on the screen mesh with many of the components being aligned longitudinally, thereby manufacturing a nonwoven fabric with the filaments mainly aligned longitudinally.

Japanese Patent Publication No. 6126/95 describes, as spray spinning, a method of manufacturing a nonwoven fabric with one direction alignment in which a plurality of filaments are aligned substantially in one direction. In the manufacturing method, when filaments are spun by discharging polymeric materials from a port for spinning, first, the spun filaments are rotated or vibrated in a width direction. While the rotating or vibrating filaments have draft properties by a factor of two or more, the filaments are acted on by a pair of fluids or more substantially symmetrically about one of the rotating or vibrating filaments from the side of the filament. "Draft properties" refers to the property of how much filaments are drawn. Such action of the pair of fluids or more on the filaments causes the filaments to be scattered in a direction perpendicular to the discharged direction of the filaments while draft is applied to the filaments. As a result, the filaments aligned in the scattered direction thereof are laminated in layered form to manufacture a nonwoven fabric with one direction alignment comprising the laminated filaments. "Draft is applied to the filaments" refers to drawing and thinning of the filaments by applying traction to them.

Japanese Patent No. 2612203 describes, as a method of manufacturing a nonwoven fabric, a method of manufacturing a web made of fibers aligned in one direction. In the manufacturing method, fibers are jetted together with a fluid from an ejector onto a running belt conveyor, and the fibers are collected on the belt conveyor such that the fibers are aligned in one direction. In an example of such a manufacturing method, at least part of the conveyor belt is curved perpendicularly to its running direction and downward such that the fluid and the fibers are jetted from the ejector toward the bottom of the curved portion in groove shape in the conveyor belt. The jetted fluid is scattered in a longitudinal direction of the groove in the conveyor belt, thereby aligning the fibers in the scattered direction.

In manufacturing the nonwoven fabrics, manufacture of a web of large width with high strength of a nonwoven fabric maintained is an important factor since not only does it mean an increase in production efficiency and a reduction in manufacturing unit cost, but also in terms of applications of the web, some fields find no applicability unless a web of large width is used.

Since a transversely stretched web is manufactured by stretching an original web in its transverse direction, it is easily obtained as a web of large width in general. In the spray spinning described in the aforementioned Japanese Patent Publication No. 36948/91 and Japanese Patent Publication No. 6126/95, since an original web before stretch typically has a width of 300 to 400 mm, the transverse stretch rate of the web is 5 to 6 for a web made of polypropylene (hereinafter referred to as "PP"), or 5 to 6 for a web made of polyethylene terephthalate (hereinafter referred to as "PET"). Therefore, there is a problem of the difficulty in realizing a transversely stretched nonwoven fabric with a width of 2400 mm or more as a product. A web of large width with a higher stretch rate can be manufactured by employing spinning conditions for increasing the diameter of filaments of an original web when the original web is manufactured with the spray spinning described in Japanese Patent Publication No. 36948/91 and Japanese Patent Publication No. 6126/95, and in this case more stable spinning is possible.

Conventionally, means for transversely stretching a web with both edge portions thereof held is generally used as a transverse stretch apparatus for stretching a web in its transverse direction. In addition, as such a transverse stretch apparatus, a tenter frame for use in stretching a film transversely can be used. Simple transverse stretch apparatuses are a pulley type transverse stretch apparatus, and for a film, an example is described in GB Patent Specification No. 1213441. An application of the apparatus to a nonwoven fabric is described in Japanese Patent Publication No. 3068/88, Japanese Patent Publication No. 36948/91 (U.S. Pat. No. 4,992,124 Specification corresponding to that gazette) which are the earlier inventions by the present inventors. A transverse stretch apparatus with means composed by combining a pair of upper and lower groove rolls has been used (Japanese Patent Publication No. 32307/84, U.S. Pat. No. 4,223,059 Specification).

In general, a transversely stretched web of large width can be obtained from an original web of small width by increasing a transverse stretch rate. However, since stretch at a higher rate involves stretch breaking of filaments at the stretch, the rate inevitably has a limitation. While it is possible to achieve only an increase in the stretch rate by increasing the temperature of an original web or the stretch temperature in stretching the original web, stretch at a high temperature cannot ensure sufficient strength of the resultant transversely stretched web in general. Thus, a stretch rate of the order of 5 to 6 as described above can ensure a certain degree of strength, but at a stretch rate of 7 or more, it is difficult to manufacture a transversely stretched web of large width with a desired strength.

On the other hand, as a method of stretching a web in its lengthwise direction or a longitudinal direction there is a proximity stretch method. The proximity stretch is a method in which rollers are used for longitudinally stretching a web, for example, to perform a longitudinal stretch with an extremely reduced stretch distance for the web. It is difficult to apply the proximity stretch which is applied to such longitudinal stretch to transverse stretch of a web. In the transverse stretch, generally, an original web is transversely stretched with both edge portions thereof held. Therefore, it is desirable not only to transversely align filaments constituting a web but also to extend each filament from one edge to the other edge in a width direction of the web in the transverse stretch of webs as compared with the longitudinal stretch. Thus, the proximity stretch used in the longitudinal stretch can not be applied to the transverse stretch, and the transverse stretch methods and transverse stretch apparatuses in the prior art have a problem of the difficulty in realizing a high stretch rate with the high strength of a web being maintained.

In the transverse stretch, as a mechanism similar to the proximity stretch using rolls in the longitudinal stretch, Japanese Patent Publication No. 36948/91 describes a transverse stretch method of groove roll type, for example. The transverse stretch method of groove roll type employs a pair of groove rolls which is arranged such that peaks of one groove roll match valleys of the other groove roll. A nonwoven fabric comprising un-oriented filaments is introduced between the pair of groove rolls to transversely stretch the nonwoven fabric by means of the projections and depressions of the peaks and valleys of the groove rolls. However, the transverse stretch method of groove roll type has disadvantages of a low stretch rate, low uniformity of stretch and the like, which render the method unsuitable as a stretch method for obtaining high strength of a nonwoven fabric. As a result, the method can be used for stretch of a nonwoven fabric which does not require high strength, but it is not suitable for obtaining a high stretch rate and high strength.

In particular, the stretch of PET filaments has characteristics of a narrow range of temperatures suitable for stretch at which high strength of a nonwoven fabric is obtained, i.e., stretch suitable temperatures at which high strength of a nonwoven fabric is obtained, and significant variations in the stretch suitable temperature depending on a stretch speed and a stretch rate. These characteristics make it difficult to stretch a web comprising PET filaments. Specifically, it is difficult to obtain a transversely stretched web of large width with high strength maintained and at a high stretch rate as a web comprising PET filaments. Therefore, stretch which can solve such difficulties must be performed in order to manufacture a web of large width comprising PET filaments.

In such transverse stretch at a high rate, it is necessary not only to achieve a high stretch rate, but also to provide uniformly stretched portions of a transversely stretched web obtained by stretch and to provide uniform strength distribution and basis weight in the stretched web, a reduced frequency of stretch breaking of filaments and the like. Therefore, a method of transversely stretching a web at a high stretch rate does not provide stretch means in an industrial sense unless such uniform transverse stretch is realized.

When a transverse stretch apparatus used for the aforementioned purposes is expensive or requires a large floor area, the transverse stretch apparatus has no practicality as a nonwoven fabric manufacturing apparatus which has the requirement of being inexpensive. In addition, it is necessary for the transverse stretch apparatus to freely change a stretch rate and to easily deal with troubles such as stretch breaking in a simple manner. Furthermore, even such a simple and inexpensive transverse stretch apparatus must enable fast stretch and realize uniform stretch at a high rate as described above. Particularly in stretch of a nonwoven fabric, the aforementioned purposes such as stretch at a high rate, high-speed stretch, and uniform stretch cannot be achieved unless an original material formed from collected flocculent filaments and an apparatus are employed in the stretch, the apparatus being capable of completely replacing the air contained within the collected flocculent filaments with a heated medium at a temperature increased to a stretch temperature.

SUMMARY OF THE INVENTION

It is an object of the present invention to provide a transversely stretched nonwoven fabric in which, when an original web is transversely stretched to manufacture a transversely stretched nonwoven fabric, high tensile strength can be obtained in the resultant nonwoven fabric in a transverse direction even at a stretch rate of the original web of 7 or higher, specifically, at least 132.5 mN/tex (1.5 g/d), desirably 158.9 mN/tex (1.8 g/d) or higher, more desirably 176.6 mN/tex (2.0 g/d) or higher, most desirably 220.8 mN/tex (2.5 g/d) or higher is obtained as a tensile strength of the web in the transverse direction, a method of manufacturing such a transversely stretched nonwoven fabric, and a transverse stretch apparatus capable of manufacturing a transversely stretched nonwoven fabric at such a stretch rate and strength.

It is another object of the present invention to provide a transversely stretched nonwoven fabric having texture like a cloth, a method of manufacturing such a transversely stretched nonwoven fabric, and a transverse stretch apparatus capable of manufacturing such a transversely stretch nonwoven fabric. It is desired that the diameter of filaments constituting the stretched web is at least 20 μm or lower, desirably 10 μm, more desirably 5 to 8 μm.

It is a further object of the present invention to provide a transverse stretch apparatus which, when an original web is heated in order to transversely stretch the original web to manufacture a transversely stretched nonwoven fabric, allows quick and uniform heating of the original web to provide fast and uniform stretch of the original web at a high rate, and a heating unit for use in the transverse stretch apparatus.

To achieve the aforementioned objects, the transversely stretched nonwoven fabric according to the present invention comprises a plurality of transversely aligned filaments with a fiber diameter of 20 μm or lower, has a stretch rate of 7 or more in a transverse direction, and has a tensile strength of 132.5 mN/tex (1.5 g/d) or higher in the transverse direction. For the tensile strength of a transversely stretched nonwoven fabric, breaking strength is represented as a breaking load per 5 centimeters in the long fiber filament nonwoven fabric test method in compliance with JIS (Japanese Industrial Standards) L1906. However, the present invention employs representation of tensile strength as strength per tex (mN/tex) with conversion from the weight of a nonwoven fabric to fineness (tex) since nonwoven fabrics of various basis weights have been tested. For reference, strength per denier (d) is also shown in the following description. The realization of the aforementioned transversely stretched nonwoven fabric can result in a web of large width at a stretch rate of 7 or more in the transverse direction while a high tensile strength of 132.5 mN/tex (1.5 g/d) or higher is maintained. This causes enhanced production efficiency of the transversely stretched nonwoven fabric and reduced manufacturing unit cost of the transversely stretched nonwoven fabric as a web of large width. In addition, such a transversely stretched nonwoven fabric with high strength and a high transverse stretch rate obtained as a web of large width leads to wide applicability of the transversely stretched nonwoven fabric in terms of applications of the web. Moreover, since the fiber diameter of the filaments constituting the transversely stretched nonwoven fabric is 20 μm or lower, the transversely stretched nonwoven fabric has the texture of cloth.

In the method of manufacturing the transversely stretched nonwoven fabric according to the present invention, first, an original web comprising un-oriented filaments is stretched 1.2 to 3 times wider in its transverse direction at a temperature higher than its stretch suitable temperature by 5° C. or more. This step causes the filaments of the original web to be stretched with almost no molecular orientation of the filaments involved. At this point, the strength of the original web is not increased yet. If the stretch rate in the transverse direction is 1.2 or lower at this step, the original web cannot be transversely stretched at a high rate at the next step, and if the stretch rate is 3 or higher, the strength of the original web is reduced. Next, the original web stretched 1.2 to 3 times wider in the transverse direction is further stretched transversely at the stretch suitable temperature to stretch the original web 7 times wider or more in the transverse direction in total as compared with the state of the original web before the stretch. In this manner, a transversely stretched nonwoven fabric made of the original web stretched 7 times wider or more in the transverse direction in total is manufactured. At this step, the original web is transversely stretched at a high rate at the stretch suitable temperature of the original web, and it is possible to obtain a tensile strength of the transversely stretched nonwoven fabric in the transverse direction equal to or higher than that in normal stretch at the stretch suitable temperature. The method of manufacturing the transversely stretched nonwoven fabric including the two-step stretch provides a web of large width stretched at a high rate of 7 or more while a high tensile strength of 132.5 mN/tex (1.5 g/d) or higher in the transverse direction is maintained. Thus, the production efficiency of the transversely stretched nonwoven fabric is increased, and manufacturing unit cost of the transversely stretched nonwoven fabric as a web of large width is reduced. It is also possible to manufacture such a transversely stretched nonwoven fabric as a web of large width with high strength and a high transverse stretch rate and to obtain a transversely stretched nonwoven fabric with wide applicability in terms of applications of the web.

The stretch suitable temperature depends on kinds of polymers of filaments, degree of polymerization, temperature of spinning, speed of spinning, cooling condition and so on. In general, a stretch temperature at which strength of the web after stretching rises most when a nonwoven fabric is stretched is adopted as the stretch suitable temperature. A range of the stretch suitable temperature of polypropylene nonwoven fabric which is well-cooled in spinning is between 100° C. to 130° C. in the hot wind stretching, preferably between 105° C. to 120° C. The stretch suitable temperature of polyethylene telephthalate nonwoven fabric depends on a stretch speed mainly, the stretch suitable temperature is 80° C. to 95° C. at low speed and 95° C. to 105° C. at high speed.

"unoriented filament" does not mean that the degree of molecular orientation is completely zero, it is possible to stretch the unoriented filament 3 times wider or more at its stretch suitable temperature. When unoriented filament is shown with degree of molecular orientation which was measured with birefringence and so on, degree of orientation of a perfect orientation is 100% and "unoriented filament" refers to the filament having degree of orientation of 10% or less.

According to one aspect of the method of manufacturing a transversely stretched nonwoven fabric of the present invention, a method of manufacturing a transversely stretched nonwoven fabric particularly suitable for a web comprising un-oriented filaments mainly made of polyethylene terephthalate (PET) is provided as a manufacturing method which allows the web to be stretched transversely at a high stretch rate. In the manufacturing method, while an original web comprising un-oriented filaments mainly made of polyethylene terephthalate is heated by hot air to a temperature of 100° C. or higher and is moved at a line speed of 20 m/min or higher at the same time, the original web is stretched 7 times wider or more in its transverse direction in total such that the original web has a tensile strength of 132.5 mN/tex (1.5 g/d) in a transverse direction. According to the manufacturing method, when a transversely stretched nonwoven fabric mainly made of PET is manufactured, it is possible to manufacture a transversely stretched nonwoven fabric with a tensile strength of 132.5 mN/tex (1.5 g/d) in the transverse direction and a transverse stretch rate of 7 or more. It is preferable to use an original web comprising transversely aligned filaments as the original web before the transverse stretch. The use of such an original web for manufacturing the transversely stretched nonwoven fabric enables high strength and a high stretch rate to be realized in the transversely stretched nonwoven fabric.

The transverse stretch apparatus of the present invention uses the method of manufacturing the transversely stretch nonwoven fabric with the two-step stretch as described above. In the transverse stretch apparatus, first, an original web comprising un-oriented filaments is heated by first heating means to a temperature higher than its stretch suitable temperature by 5° C. or more. The heated original web is stretched 1.2 to 3 times wider in its transverse direction by first stretch means. This causes the filaments of the original web to be stretched with almost no molecular orientation of the filaments involved. At this point, the strength of the original web is not increased yet. Next, the original web stretched 1.2 to 3 times wider in the transverse direction is heated to the stretch suitable temperature by second heating means, and is further stretched transversely by second stretch means at the stretch suitable temperature. This results in a transversely stretched nonwoven fabric made of the original web stretched 7 times wider or more in the transverse direction in total as compared with the state before the stretch by the first stretch means. Such a transverse stretch apparatus can be used to transversely stretch the original web at a high rate at the stretch suitable temperature thereof, and to obtain a tensile strength of the transversely stretched nonwoven fabric in the transverse direction equal to or higher than that in normal stretch at the stretch suitable temperature. The transverse stretch apparatus of performing such two-stretch provides, as a web of large width, a transversely stretched nonwoven fabric stretched at a high rate of 7 or more while a high tensile strength of 132.5 mN/tex (1.5 g/d) or higher in the transverse direction is maintained. Thus, the production efficiency of the transversely stretched nonwoven fabric is increased, and manufacturing unit cost of the transversely stretched nonwoven fabric as a web of large web is reduced. Since such a transversely stretched nonwoven fabric can be manufactured as a web of large width with high strength and a high transverse stretch rate, it is also possible to obtain a transversely stretched nonwoven fabric with wide applicability in terms of applications of the web.

In addition, first preheat means may be provided for preheating the original web by blowing hot air toward the original web such that the hot air passes through the original web before the heating of the original web by the first heating unit.

Second preheat means may also be provided for heating the original web by blowing hot air toward the original web such that the hot air passes through the original web before the original web stretched transversely by the first stretch means is heated by the second heating unit to its stretch suitable temperature.

The heating unit of the present invention heats the original web by hot air before the original web is transversely stretched and has a net member for supporting the original web at the heating by the hot air. The heating unit is provided, for example, for a transverse stretch apparatus for manufacturing a transversely stretched nonwoven fabric by transversely stretching an original web. When the original web is heated by the heating unit, hot air is blown toward the original web such that the hot air passes through the original web. At this point, the original web is supported on the net member by said net member contacting the surface of the original web opposite to the side on which the hot air is blown in the portion in which the hot air is blown. At least part of the hot air through the original web further passes through the net member. Thus, deformation of the original web such as expansion thereof due to the hot air is prevented. Since at least part of the hot air through the original web further passes through the net member, the air contained in the original web, or the air present in the gaps between the filaments forming the original web is replaced with the air at a high temperature for heating the original web. Thus, the original web can be quickly and uniformly heated to an intended stretch temperature to stretch the original web. As the net member, a mesh roll of hollow cylindrical shape rotatably supported and having a plurality of through holes formed in its wall, or a mesh conveyor belt supported movably in one direction can be used.

The above and other objects, features and advantages of the present invention will become apparent from the following description with reference to the accompanying drawings which illustrate examples of the present invention.

BRIEF DESCRIPTION OF THE DRAWINGS

FIG. 6 is a perspective view showing the configuration of a second transverse stretch unit shown in FIG. 1;

DETAILED DESCRIPTION OF THE PREFERRED EMBODIMENTS

In the present invention, "a longitudinal direction" used for describing an alignment direction of filaments in a nonwoven fabric, a stretch direction and the like refers to the feeding direction of the nonwoven fabric in manufacturing the nonwoven fabric, while "a transverse direction" refers to a direction perpendicular to the longitudinal direction, i.e., a width direction of the nonwoven fabric. For tensile strength of the nonwoven fabric, while JIS (Japanese Industrial Standards) L1096 employs representation of breaking strength as a breaking load per 5 centimeters, the present invention employs representation of tensile strength as strength per tex (mN/tex) with conversion from the weight of a nonwoven fabric to fineness (tex) since nonwoven fabrics of various basis weights have been tested. For reference, strength per denier (d) is also shown.

First Embodiment

Figure 1:
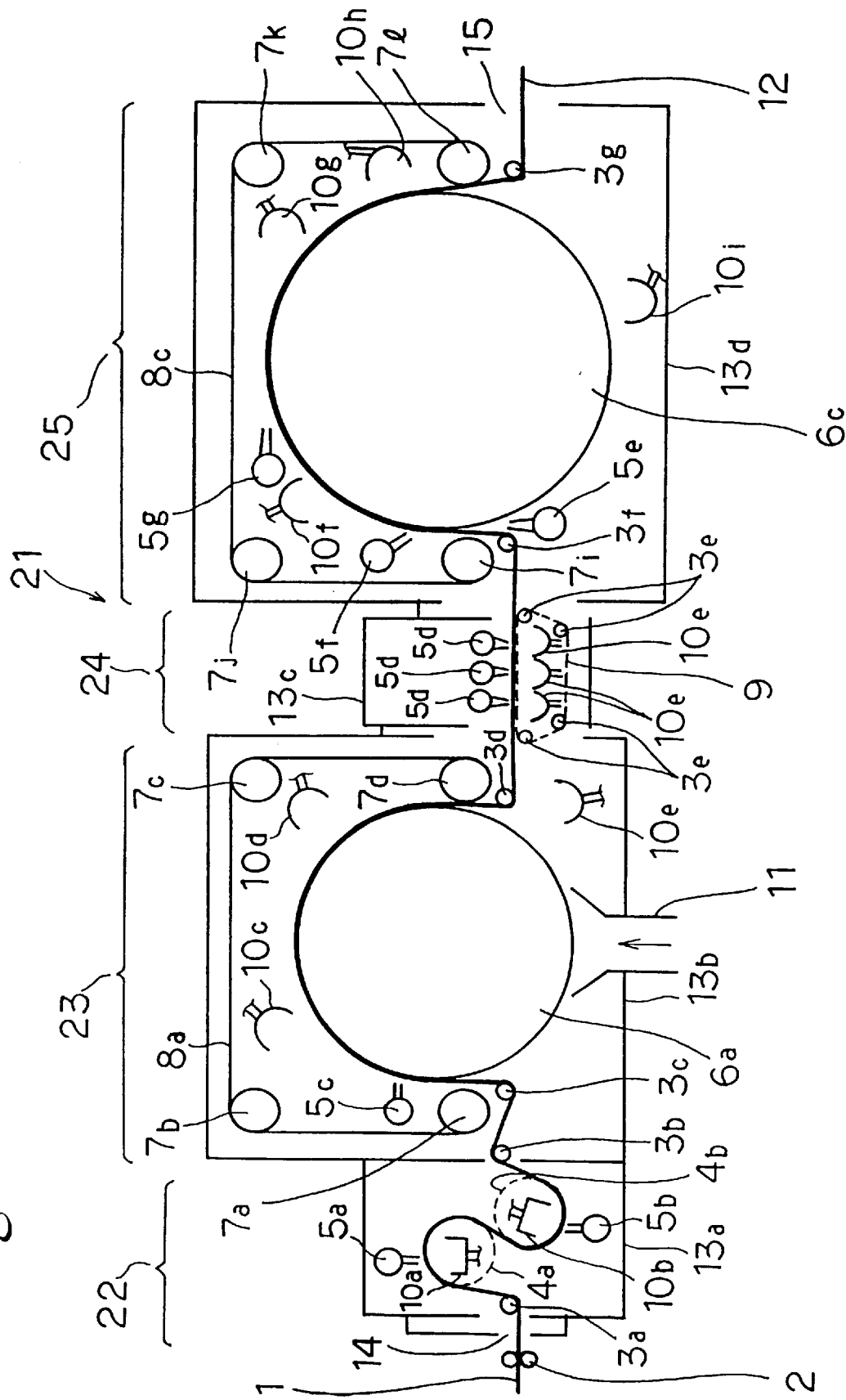
FIG. 1 is a sectional view showing a two-step transverse stretch apparatus which is a first embodiment of a transverse stretch apparatus of the present invention.

Referring to FIG. 1, there is shown two-step transverse stretch apparatus 21, which is a transverse stretch apparatus of a first embodiment of the present invention, comprising preheat unit 22, first transverse stretch unit 23, preheat unit 24, and second transverse stretch unit 25. Preheat unit 22 is arranged upstream in the moving direction of original web 1 used for manufacturing a transversely stretched nonwoven fabric. Preheat unit 22, first transverse stretch unit 23, preheat unit 24, and second transverse stretch unit 25 are aligned in this order along the moving direction of original web 1. Original web 1 is stretched 7 times wider or more in its transverse direction in total by two-step transverse stretch apparatus 21. Original web 1 before stretch with two-step transverse stretch apparatus 21 comprises un-oriented filaments having many components thereof aligned transversely.

Each of first transverse stretch unit 23 and second transverse stretch unit 25 is a transverse stretch unit of pulley type which is an example of a stretch apparatus preferable for transversely stretching such original web 1. Each of first transverse stretch unit 23 and second transverse stretch unit 25 is provided with a pair of pulleys and a pair of circulating belts for transversely stretching original web 1. Original web 1 is manufactured by scattering filaments discharged from a spinning nozzle with air such that many of the unoriented filaments are aligned transversely. In first transverse stretch unit 23, original web 1 is stretched 1.5 to 3 times wider in its transverse direction at a temperature higher than its stretch suitable temperature by 5° C. or more. The step in first transverse stretch unit 23 is referred to as preliminary stretch. In second transverse stretch unit 25, original web 1 after the transverse stretch in first transverse stretch unit 23 is further stretched transversely such that original web 1 is stretched 7 times wider or more in the transverse direction in total as compared with the state before the stretch in first transverse stretch unit 23. The step in second transverse stretch unit 25 is referred to as main stretch. The stretch suitable temperature of original web 1 refers to a temperature suitable for stretch at which a desired strength of original web 1 in a transverse direction is obtained in transversely stretching original web 1. The main stretch in second transverse stretch unit 25 is performed for the purpose of achieving strength of original web 1 in a transverse direction in transversely stretching original web 1.

Figure 2:
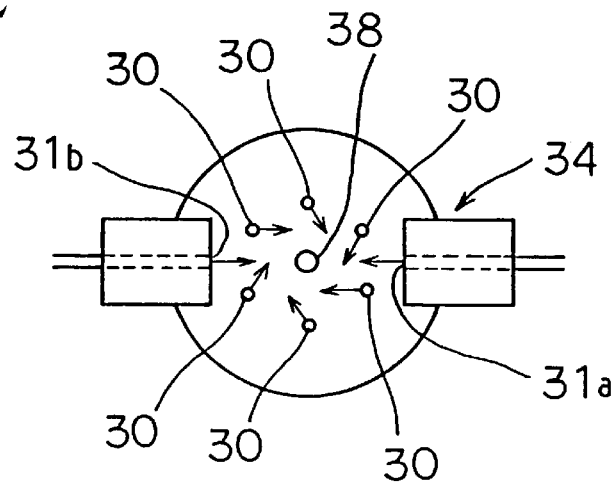
FIG. 2 is a plan view showing a spinning nozzle for forming an original web for use in manufacturing a transversely stretched nonwoven fabric with the two-step transverse stretch apparatus shown in FIG. 1.
Figure 3:
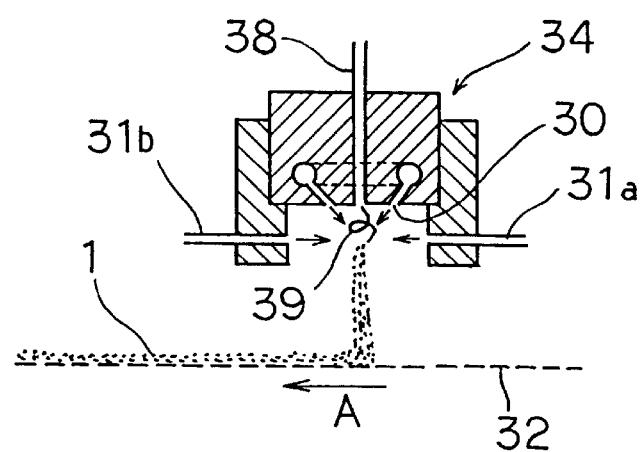
FIG. 3 is a diagram showing part of a manufacturing apparatus using the spinning nozzle shown in FIG. 2, viewed from the side.
Figure 4:
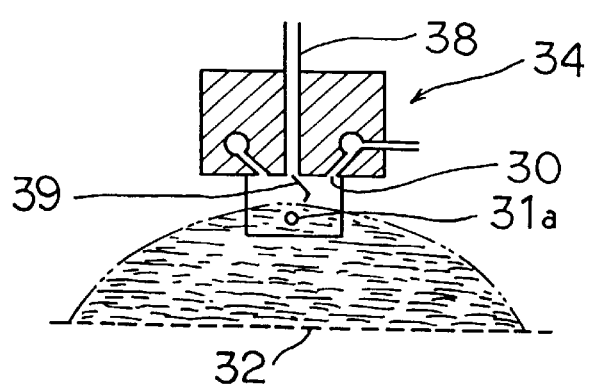
FIG. 4 is a diagram showing part of the manufacturing apparatus using the spinning nozzle shown in FIG. 2, viewed from the front.

Next, description is made for steps of manufacturing original web 1 for use in manufacturing a transversely stretched nonwoven fabric in two-step transverse stretch apparatus 21 shown in FIG. 1, with reference to FIG. 2 to FIG. 4. FIG. 4 shows filaments which are spread transversely.

In manufacturing original web 1, as shown in FIG. 2 to FIG. 4, molten liquid 39 of filaments which are to form original web 1 is discharged downward from discharge port 38 of spinning nozzle 34. Six air holes 30 opened with slight inclination are provided around discharge port 38. Normally, three to eight air holes 30 are provided. Air flows ejected from respective air holes 30 intersect molten liquid 39 discharged from discharge port 38 in a range from several to ten and several centimeters away from discharge port 38. Molten liquid 39 intersecting the air flows from air holes 30 is rotated in a spiral above screen mesh 32 which is of strip shape and runs in one direction indicated by arrow A shown in FIG. 3.

Other air holes 31a, 31b are provided below discharge port 38 and air holes 30. Air holes 31a, 31b jet air flows toward the direction perpendicular to the running direction of screen mesh 32 such that the air flows from air holes 31a, 31b intersect below discharge port 38. The air flows jetted from air holes 31a, 31b collide with each other below discharge port 38, and the colliding air flows spread perpendicularly to the running direction of screen mesh 32. As a result, the jet of the spread air causes the discharged filaments rotating in a spiral to be sprayed perpendicularly to the running direction of screen mesh 32. Thereafter, the sprayed filaments are accumulated on screen mesh 32 running below them with many of the components aligned transversely, thereby forming original web 1 serving as a nonwoven fabric with the filaments mainly aligned transversely. Typically, single spinning nozzle 34 sprays molten liquid 39 in a width of 100 to 350 mm.

Next, description is made for each unit constituting two-step transverse stretch apparatus 21 shown in FIG. 1.

In preheat unit 22 as a heating unit for preheating original web 1, a pair of mesh rolls 4a, 4b which is a net-like member, and hot air blow ports 5a, 5b are disposed within housing 13a. Hot air blow port 5a corresponds to mesh roll 4a, while hot air blow port 5b corresponds to mesh roll 4b. Preheat unit 22 is provided with a hot air producing unit, not shown, for producing hot air which is discharged from hot air blow ports 5a, 5b. The hot air producing unit, hot air blow ports 5a, 5b, mesh rolls 4a, 4b, and the like constitute preheat unit 22 serving as first preheat means. The hot air in preheat unit 22 preheats original web 1 before original web 1 is moved to first transverse stretch unit 23.

Introduction port 14 is formed for introducing original web 1 into housing 13a in the wall opposite to first transverse stretch unit 23 in housing 13a of preheat unit 22. Cross guide 2 is arranged near introduction port 14 outside housing 13a. Cross guide 2 is provided for feeding original web 1 such that original web 1 is introduced straight into housing 13a, not into housing 13a with a bend in its moving direction. Original web 1 is moved to mesh rolls 4a, 4b through cross guide 2 and turn roll 3a in housing 13a.

Each of mesh rolls 4a, 4b is rotatably supported. As original web 1 wound around mesh rolls 4a, 4b is moved, the movement of original web 1 causes mesh rolls 4a, 4b to be rotated. The pair of mesh rolls 4a, 4b is provided for supporting original web 1 in heating original web 1 with hot air. When original web 1 is heated in mesh rolls 4a, 4b, the hot air is blown on original web 1 such that the hot air passes through original web 1. At this time, mesh rolls 4a, 4b support original web 1 to prevent deformation of original web 1 such as expansion due to the hot air. Each of mesh rolls 4a, 4b has a hollow cylindrical shape and a mesh wall formed by providing a plurality of through holes in the wall, for example. Original web 1 introduced into housing 13a is moved to first transverse stretch unit 23 after it is wound around part of each of mesh rolls 4a, 4b.

When part of original web 1 is wound around mesh roll 4a, the hot air from hot air blow port 5a is blown toward the portion of original web 1 in contact with mesh roll 4a. The hot air from hot air blow port 5a passes through original web 1 and heats original web 1. At this point,; the air within original web 1, i.e., the air present in the gap between the filaments constituting original web 1 is replaced with the air at a high temperature from hot air blow port 5a. This enables quick and uniform heating of original web 1.

Mesh roll 4a supports original web 1 by contacting the surface of original web 1 opposite to the side on which the hot air from hot air blow port 5a is blown in the portion in which the hot air is blown. The hot air through original web 1 passes through the through holes in the wall of mesh roll 4a and flows into mesh roll 4a. This prevents original web 1 from being deformed due to the hot air or from moving. Exhaust box 10a is disposed within mesh roll 4a. Of the hot air from hot air blow port 5a, the hot air passing through original web 1 and the through holes in the wall of mesh roll 4a and flowing into mesh roll 4a is sucked through exhaust box 10a.

Similarly, when part of original web 1 is wound around mesh roll 4b, the hot air from hot air blow port 5b is blown on the portion of original web 1 in contact with mesh roll 4b. In this manner, the hot air from hot air blow port 5b heats original web 1. Also in this case, mesh roll 4b supports original web 1 by contacting the surface of original web 1 opposite to the side on which the hot air from hot air blow port 5b is blown in the portion in which the hot air is blown. The hot air through original web 1 passes through the through holes in the wall of mesh roll 4b and flows into mesh roll 4b. This prevents original web 1 from being deformed due to the hot air or from moving.

Exhaust box 10b is disposed within mesh roll 4b. Of the hot air from hot air blow port 5b, the hot air passing through original web 1 and the through holes in the wall of mesh roll 4b and flowing into mesh roll 4b is sucked through exhaust box 10b. The hot air sucked through exhaust boxes 10a, 10b is discharged to the outside of housing 13a through a ventilation pipe.

Preheat unit 22 for passing the hot air through original web 1 as described above employs mesh rolls 4a, 4b, i.e., cage roll of cylindrical shape. On the other hand, in preheat unit 22, another effective method is that a web is carried and moved on a conveyor running in a plane such that the hot air passes through the web from above the conveyor to preheat the web.

Next, the configuration of first transverse stretch unit 23 shown in FIG. 1 is described with reference to FIGS. 1 and 5.

Figure 5:
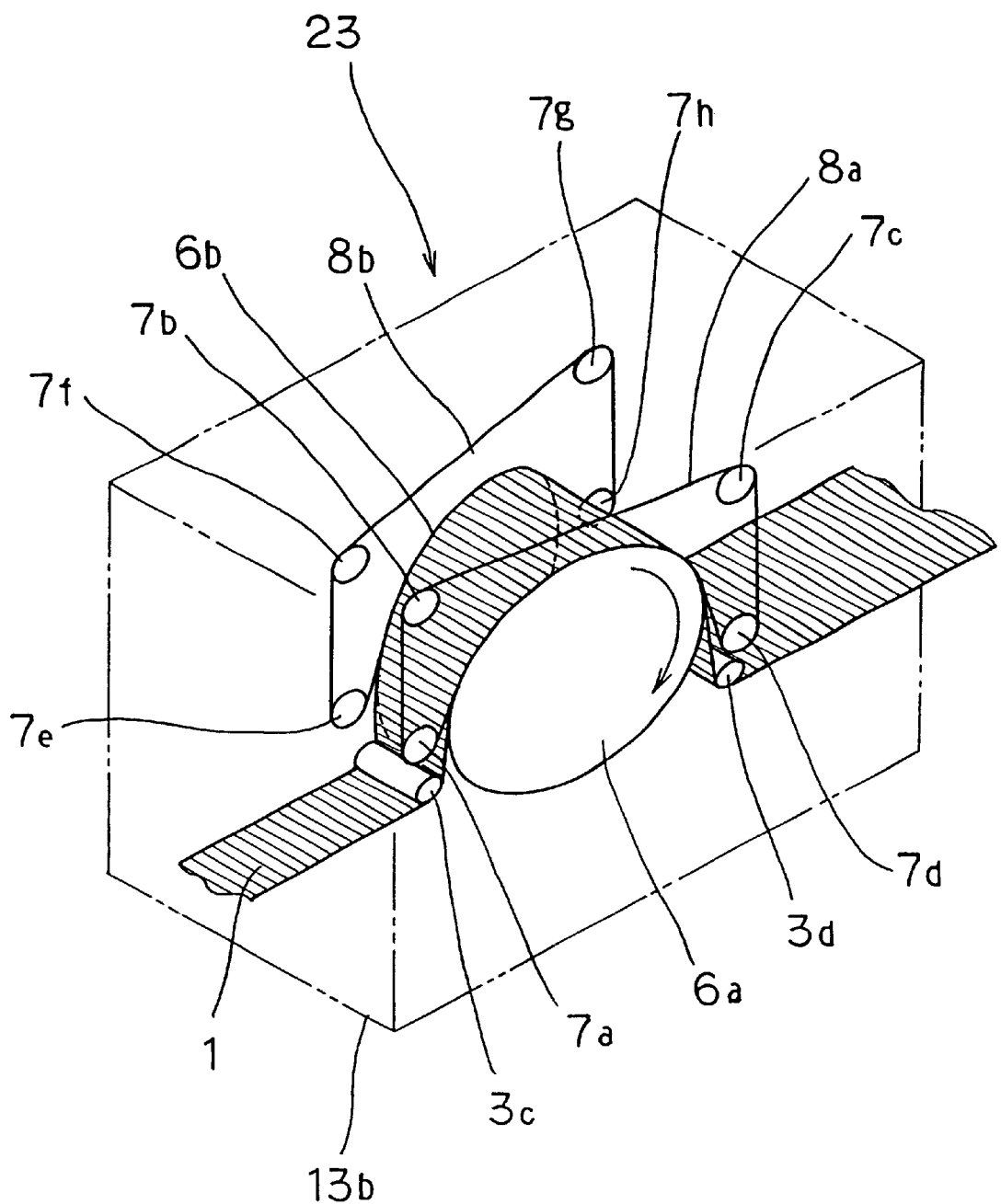
FIG. 5 is a perspective view showing the configuration of a first transverse stretch unit shown in FIG. 1.

As shown in FIG. 5, first transverse stretch unit 23 serving as first stretch means comprises housing 13b, a pair of left and right stretch pulleys 6a, 6b surrounded by housing 13b, circulating belts 8a, 8b, and the like. First transverse stretch unit 23 is provided with a drive for rotating stretch pulleys 6a, 6b. Original web 1 is stretched 1.2 to 3 times wider in its transverse direction by first transverse stretch unit 23 at a temperature higher than its stretch suitable temperature by 5° C. or more. The pair of left and right stretch pulleys 6a, 6b have the same peripheral speed and arranged symmetrically about the center line such that the outer peripheries of the paired left and right stretch pulleys 6a, 6b have a track gradually widening from upstream to downstream in the moving direction of original web 1, i.e., a gradually widening track.

Each of the paired stretch pulleys 6a, 6b has a belt groove formed on its outer periphery. Part of circulating belt 8a is fitted to the belt groove of stretch pulley 6a, while part of circulating belt 8b is fitted to the belt groove of stretch pulley 6b. Circulating belt 8a (or rope) is stretched by rollers 7a to 7d such that part of circulating belt 8a circulates on the track of the peripheral surface of stretch pulley 6a in the gradually widening track formed by the pair of stretch pulleys 6a, 6b. Circulating belt 8b (or rope) is stretched by rollers 7e to 7h such that part of circulating belt 8b circulates on the track of the peripheral surface of stretch pulley 6b in the gradually widening track.

In such first transverse stretch unit 23, original web 1 comprising un-oriented filaments from preheat unit 22 passes through turn rolls 3b, 3c in housing 13b and is introduced to the portion where the space between stretch pulleys 6a and 6b is the narrowest in the paired stretch pulleys 6a and 6b. Original web 1 introduced from preheat unit 22 into stretch pulleys 6a, 6b is carried with its one edge portion in a transverse direction held between the belt groove of stretch pulley 6a and circulating belt 8a and the other edge portion held between the belt groove of stretch pulley 6b and circulating belt 8b. In this manner, original web 1 is moved with both edge portions in its width direction sandwiched between stretch pulleys 6a, 6b and circulating belts 8a, 8b. At this point, original web 1 is stretched 1.2 to 3 times wider in the transverse direction by pulling both edge portions of original web 1 on the gradually widening track formed by stretch pulleys 6a, 6b such that the distance between both edge portions is increased. Transversely stretched original web 1 comes away from stretch pulleys 6a, 6b and circulating belts 8a, 8b at the position where the track of stretch pulleys 6a, 6b is the widest. Original web 1 leaving stretch pulleys 6a, 6b is moved outside housing 13b through turn roll 3d in housing 13b. Original web 1 stretched 1.2 to 3 times wider in the transverse direction in first transverse stretch unit 23 in this manner is moved to preheat unit 24.

Housing 13b is provided with hot air blow port 11 at the bottom. In addition, hot air blow port 5c is disposed near upstream in the moving direction of original web 1 in the portion of original web 1 held at both edge portions by stretch pulleys 6a, 6b and circulating belts 8a, 8b. Hot air blow port 5c is provided for blowing hot air on the upstream portion of original web 1 in the moving direction thereof within housing 13b. These hot air blow ports 11, 5c, a hot air producing unit for producing hot air which is discharged from hot air blow ports 11, 5c and the like constitute a heating unit serving as first heating means. The heating unit heats original web 1 in housing 13b to a temperature higher; than its stretch suitable temperature by 5° C. or more.

Hot air blow port 11 is provided for blowing hot air on original web 1 from the outside of housing 13b through the space between stretch pulleys 6a and 6b within housing 13b. Hot air blow port 11 discharges hot air into housing 13b such that the hot air from hot air blow port 11 passes through original web 1. In this manner, the hot air blown on original web 1 is such that the hot air from hot air blow port 11 passes through original web 1 increases the thermal efficiency in heating original web 1.

Hot air blow port 5c also discharges hot air toward original web 1 such that the hot air therefrom passes through original web 1. The hot air from each of hot air blow ports 11, 5 heats original web 1 to a temperature higher than its stretch suitable temperature by 5° C. or more.

Exhaust boxes 10c, 10d are provided on the side of original web 1 opposite to hot air blow port 11 in the portion in which the hot air from hot air blow port 11 is blown. Exhaust box 10c is disposed at a position away from hot air blow port 5c by a predetermined distance downstream in the moving direction of original web 1. Exhaust box 10d is disposed at a position away from exhaust box 10c by a predetermined distance downstream in the moving direction of original web 1. Exhaust boxes 10c, 10d suck the hot air passing through original web 1 of the hot air from hot air blow port 11. Exhaust box 10e is also disposed below turn roll 3d and sucks the air present in housing 13b. Particularly, exhaust box 10e sucks the air at a high temperature flowing into a lower portion in housing 13b from between stretch pulleys 6a and 6b.

In preheat unit 24 serving as a heating unit for preheating original web 1 before original web 1 is stretched by second transverse stretch unit 25, mesh conveyor mesh belt 9 which is a net-like member is disposed within housing 13c. Conveyor mesh belt 9 is stretched by four turn rolls 3e and is supported to run in one direction. Conveyor mesh belt 9 is provided for supporting original web 1 when original web 1 from first transverse stretch unit 23 is heated by hot air in housing 13c. Hot air is blown on original web 1 such that the hot air passes through original web 1 in heating original web 1 on conveyor mesh belt 9. At this point, original web 1 is supported by conveyor mesh belt 9 to prevent deformation of original web 1 such as expansion due to the hot air, and original web 1 is carried toward second transverse stretch unit 25. When the hot air is blown on original web 1 on conveyor mesh belt 9, the hot air passing through original web 1 further passes through holes in conveyor mesh belt 9.

A plurality of hot air blow ports 5d are disposed in line along the moving direction of original web 1 above the portion of original web 1 on conveyor mesh belt 9. A hot air producing unit for producing hot air which is discharged from hot air blow ports 5d, a plurality of hot air blow ports 5d, conveyor mesh belt 9 and the like constitute preheat unit 24 serving as second preheat means. A plurality of suction boxes 10e are disposed corresponding to respective hot air blow ports 5d within conveyor mesh belt 9.

The hot air from each of hot air blow ports 5d is blown on the portion of original web 1 on conveyor mesh belt 9 such that the hot air passes through original web 1. With this, the air within original web 1, i.e., the air present in the gaps between the filaments forming original web 1 is replaced with the air at a high temperature from hot air blow ports 5d. Thus, original web 1 is quickly and uniformly heated. Part of the hot air from hot air blow ports 5d passes through original web 1 and the through holes in conveyor mesh belt 9 and is sucked by suction boxes 10e.

Conveyor mesh belt 9 supports original web 1 by contacting the surface of original web 1 opposite to the side on which the hot air from hot air blow ports 5d is blown in the portion in which the hot air is blown. This prevents original web 1 from being deformed and moving due to the hot air. The portion of original web 1 heated by preheat unit 24 is moved into second transverse stretch unit 25.

Next, the configuration of second transverse stretch unit 25 shown in FIG. 1 is described with reference to FIGS. 1, 6.

As shown in FIG. 6, the mechanism of second transverse stretch unit 25 serving as second stretch means is similar to that of first transverse stretch unit 23 for, transversely stretching original web 1. Second transverse stretch unit 25 comprises a pair of left and right stretch pulleys 6c, 6d for transversely stretching original web 1, and circulating belts 8c, 8d corresponding to the respective stretch pulleys. Second transverse stretch unit 25 differs from first transverse stretch unit 23 in the stretch rate of original web 1 in a transverse direction and a heating unit for heating original web 1 in second transverse stretch unit 25.

In second transverse stretch unit 25, the pair of left and right stretch pulleys 6c, 6d, circulating belt 8c corresponding to stretch pulley 6c, and circulating belt 8d corresponding to stretch pulley 6d are arranged within housing 13d. Second transverse stretch unit 25 is also provided with a drive for rotating stretch pulleys 6c, 6d. Original web 1 which has been transversely stretched by first transverse stretch unit 23 is further stretched transversely by second transverse stretch unit at its stretch suitable temperature. The additional stretch of original web 1 by second transverse stretch unit 25 causes original web 1 to be stretched transversely at a rate of 7 or more in total as compared with the state before the stretch by first transverse stretch unit 23.

The pair of left and right stretch pulleys 6c, 6d have the same peripheral speed and arranged symmetrically about the center line such that the outer peripheries of the paired left and right stretch pulleys 6c, 6d have a track gradually widening from upstream to downstream in the moving direction of original web 1, i.e., a gradually widening track.

Each of the pair of stretch pulleys 6c, 6d has a belt groove formed on its peripheral surface. Part of circulating belt 8c is fitted to the belt groove of stretch pulley 6c, while part of circulating belt 8d is fitted to the belt groove of stretch pulley 6d. Circulating belt 8c (or rope) is stretched by rollers 7i to 7l such that part of circulating belt 8c circulates on the track of the peripheral surface of stretch pulley 6c in the gradually widening track formed by the pair of stretch pulleys 6c, 6d. Circulating belt 8d (or rope) is stretched by rollers 7m to 7p such that part of circulating belt 8d circulates on the track of the peripheral surface of stretch pulley 6d in the gradually widening track.

The width at the beginning of the gradually widening track formed by stretch pulleys 6c, 6d is the same as that at the end of the gradually widening track formed by stretch pulleys 6a, 6b in first transverse stretch unit 23. Stretch pulleys 6c, 6d are disposed opposite to each other in V shape such that the width at the end of the gradually widening track of stretch pulleys 6c, 6d is larger than the width at the beginning thereof. In this manner, stretch pulleys 6c, 6d constitute the gradually widening track for further stretching transversely original web 1 supplied from first transverse stretch unit 23.

In second transverse-stretch unit 25, original web 1 from preheat unit 24 is introduced through turn roll 3f in housing 13d to the portion where the space between stretch pulleys 6c and 6d is the narrowest in the paired stretch pulleys 6c, 6d. Original web 1 introduced from preheat unit 24 onto stretch pulleys 6c, 6d is carried with both edge potions in its width direction being held between stretch pulley 6c and circulating belt 8c, and between stretch pulley 6d and circulating belt 8d, and is transversely stretched with the track formed by stretch pulleys 6c, 6d. As described above, second transverse stretch unit 25 transversely stretches original web 1 such that original web 1 is stretched transversely at a rate of 7 or more in total as compared with the state before original web 1 is transversely stretched by first transverse stretch unit 23. As a result, transversely stretched nonwoven fabric 12 formed from original web 1 stretched 7 times wider or more in the transverse direction in total is manufactured. Transversely stretched nonwoven fabric 12 thus manufactured comes away from stretch pulleys 6c, 6d and circulating belts 8c, 8d at the position where the track of stretch pulleys 6c, 6d has the largest width, and is moved to the outside of housing 13d through turn roll 3g in housing 13d.

As described above, in first transverse stretch unit 23 for performing the preliminary stretch, the hot air from hot air blow port 11 is blown toward original web 1 such that the hot air passes through original web 1 to heat original web 1. On the other hand, in second transverse stretch unit 25 for performing the main stretch, hot air is blown on original web 1 along the flow of original web 1 to heat original web 1. Three hot air blow ports 5e to 5g are provided inside housing 13d of second transverse stretch unit 25. These hot air blow ports 5e to 5g, a hot air producing unit for producing hot air which is discharged from hot air blow ports 5e to 5g and the like constitute a heating unit serving as second heating means. The heating means heats original web 1 within housing 13d to its stretch suitable temperature.

Hot air blow port 5e is disposed near turn roll 3f and on the side of original web 1 facing stretch pulleys 6c, 6d. Hot air is blown from hot air blow port 5e toward original web 1 such that the hot air discharged from hot air blow port 5e flows from the proximity of turn roll 3f in the moving direction of original web 1 along the surface of original web 1 on the sides of stretch pulleys 6c, 6d. Suction box 10i is disposed in a lower portion within housing 13d. Of the hot air discharged from hot air blow port 5e and flowing along the surface of original web 1 on the sides of stretch pulleys 6c, 6d, the hot air flowing into the proximity of the bottom within housing 13d is sucked by suction box 10i.

Hot air blow port 5f is disposed near upstream in the moving direction of original web 1 in the portion where both edge portions of original web 1 are held between stretch pulleys 6c, 6d and circulating belts 8c, 8d, and on the side of original web 1 facing circulating belts 8c, 8d. Hot air is obliquely blown from hot air blow port 5f toward the surface of original web 1 such that the hot air from hot air blow port 5 flows upstream in the moving direction of original web 1.

Hot air blow port 5g is disposed near the upper part of original web 1 in the portion where its both edge portions are held between stretch pulleys 6c, 6d and circulating belts 8c, 8d, and on the side of original web 1 facing circulating belts 8c, 8d. Hot air is discharged from hot air blow port 5g such that the hot air from hot air blow port 5g flows downstream in the moving direction of original web 1 along the surface of original web 1.

Suction box 10f is disposed near hot air blow port 5g above the surface of original web 1 facing circulating belts 8c, 8d within housing 13d. Suction box 10f sucks the air in the space upstream from hot air blow port 5g in the moving direction of original web 1. Suction boxes 10g, 10h are disposed with a predetermined interval between them above the surface of original web 1 facing circulating belts 8c, 8d within housing 13d downstream from hot air blow port 5g in the moving direction of original web 1. Suction boxes 10g, 10h sucks the air in the space downstream from hot air blow port 5g in the moving direction of original web 1.

As described above, in first transverse stretch unit 23, the hot air from hot air blow port 11 is blown on original web 1 such that the hot air passes through original web 1 to heat original web 1, while in second transverse stretch unit 25, the hot air is blown on original web 1 along the flow of original web 1 to heat original web 1. However, the configurations for heating original web 1 may be exchanged in first transverse stretch unit 23 and second transverse stretch unit 25. Specifically, in first transverse stretch unit 23, original web 1 may be heated by blowing hot air on original web 1 along the flow of original web 1. In second transverse stretch unit 25, original web 1 may be heated by a hot air passing method in which hot air is blown from below original web 1 such that the hot air passes through original web 1 and the hot air is sucked above original web 1. Alternatively, original web 1 may be heated by the hot air passing method both in first transverse stretch unit 23 and in second transverse stretch unit 25, or original web 1 may be heated by blowing hot air along the flow of original web 1 in these units.

In addition, while original web 1 is heated by hot air in first transverse stretch unit 23 and second transverse stretch unit 25 in the embodiment, original web 1 may be heated by warm water, infrared radiation or the like, instead of hot air.

As described above, in two-step transverse stretch unit 21 of the embodiment, original web 1 made of un-oriented filaments is heated by preheat unit 22 and the heating unit in first transverse stretch unit 23 to a temperature higher than the stretch suitable temperature by 5° C. or more, and heated original web 1 is stretched 1.2 to 3 times wider in the transverse direction in first transverse stretch unit 23. In this preliminary stretch step, the filaments forming original web 1 are stretched with almost no molecular orientation involved. At this point, the strength of the original web is not increased yet. Next, original web 1 stretched 1.2 to 3 times wider in the transverse direction in first transverse stretch unit 23 is further heated to the stretch suitable temperature by preheat unit 24 and the heating unit in second transverse stretch unit 25, and the heated original web 1 is further stretched transversely at the stretch suitable temperature in second transverse stretch unit 25. This main stretch step manufactures transversely stretched nonwoven fabric 12 made of original web 1 stretched 7 times wider or more in the transverse direction in total as compared with the state before the stretch in first transverse stretch unit 23. The main stretch step involves molecular orientation of the filaments forming original web 1. The step can allow a tensile strength of 132.5 mN/tex (1.5 g/d) in the transverse direction or higher for transversely stretched nonwoven fabric 12 made of stretched original web 1.

The diameter of the fiber of the filaments forming transversely stretched nonwoven fabric 12 is 1 $\mu$m or more and 20 $\mu$m or less for providing transversely stretched nonwoven fabric 12 with properties as a cloth in terms of texture. The diameter of the fiber is preferably 3 $\mu$m or more and 15 $\mu$m or less, and most preferably 5 $\mu$m or more and 12 $\mu$m or less. To obtain the diameter, it is necessary that the diameter of the fiber of the filaments forming original web 1 is 30 $\mu$m or less, desirably 20 $\mu$m or less. When the diameter of the fiber of the filaments of transversely stretched nonwoven fabric 12, i.e., the diameter of the fiber of the filaments after the stretch is 1 $\mu$m or less, the strength of transversely stretched nonwoven fabric 12 is not obtained in many cases.

A total stretch rate of the web in two-step transverse stretch apparatus 21 is 7 or higher and 20 or lower, preferably 8 or higher and 15 or lower, and most preferably 9 or higher and 12 or lower. For stretching original web 1, 20 times wider or more in the transverse direction in total, it is necessary to increase the stretch rate in first transverse stretch unit 23, i.e., the stretch rate in the preliminary stretch. However, the experimental results have shown that sufficient strength of the web after the main stretch is not obtained if the stretch rate in the preliminary stretch is too high.

With manufacture of transversely stretched nonwoven fabric 12 using such two-step transverse stretch apparatus 21, original web 1 is transversely stretched at a high rate at the stretch suitable temperature, and it is possible to obtain a tensile strength of transversely stretched nonwoven fabric 12 in the transverse direction equal to or higher than that in normal stretch at the stretch suitable temperature. As a result, the transverse stretch apparatus for performing the two-step stretch can manufacture, as a web of large width, transversely stretched nonwoven fabric 12 stretched at a high stretch rate of 7 or more while a high tensile strength of 132.5 mN/tex (1.5 g/d) or higher is ensured in the transverse direction. Thus, the production efficiency of transversely stretched nonwoven fabric 12 can be enhanced to reduce the manufacturing unit cost of transversely stretched nonwoven fabric 12 as a web of large width. In addition, since transversely stretched nonwoven fabric 12 at a high stretch rate in the transverse direction can be manufactured with such high strength as a web of large width, it is possible to obtain transversely stretched nonwoven fabric 12 with wide applicability in terms of applications of the web.

Second Embodiment

A transverse stretch apparatus of a second embodiment of the present invention employs a so-called tenter frame in which both edge portions of an original web in a transverse direction are held in one plane to stretch transversely the original web.

Figure 7A:
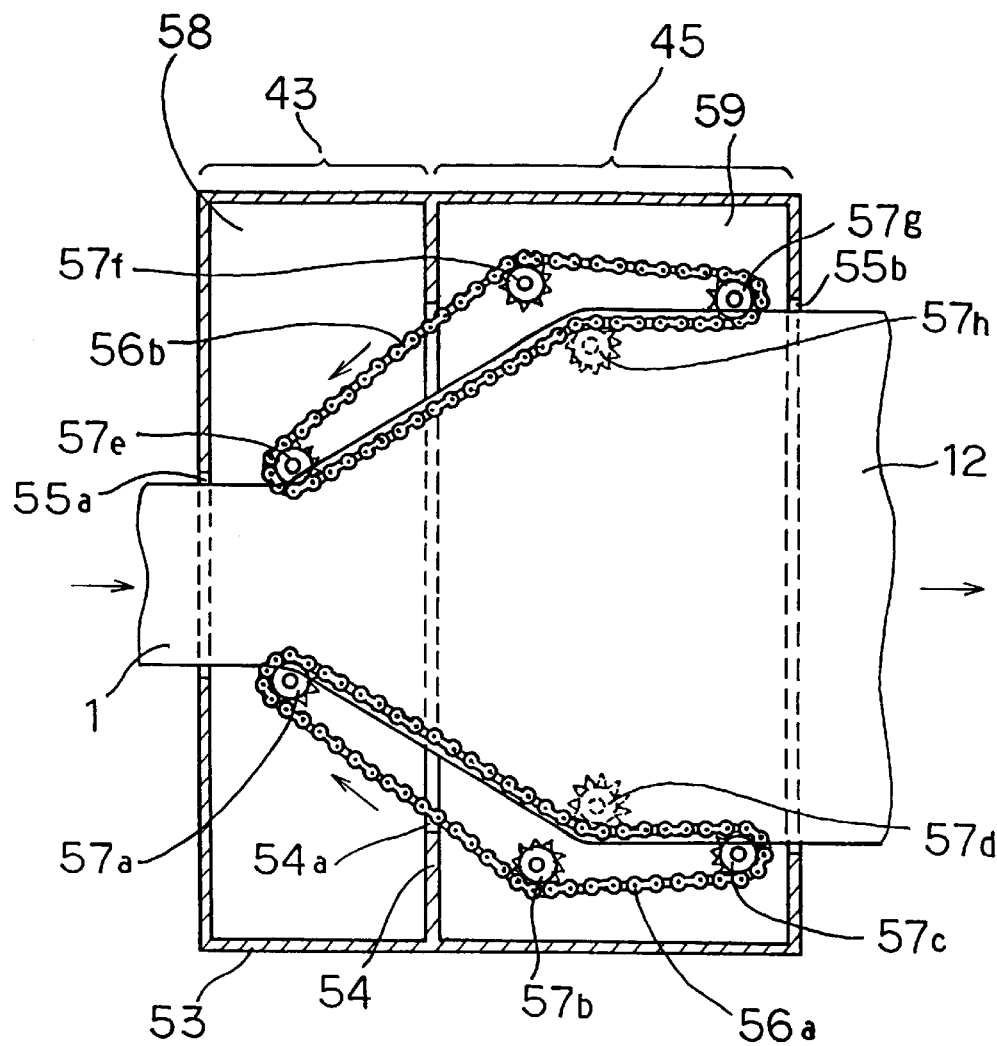
FIG. 7A is a diagram showing the interior of a transverse stretch apparatus of a second embodiment of the present invention, viewed from the top.
Figure 7B:
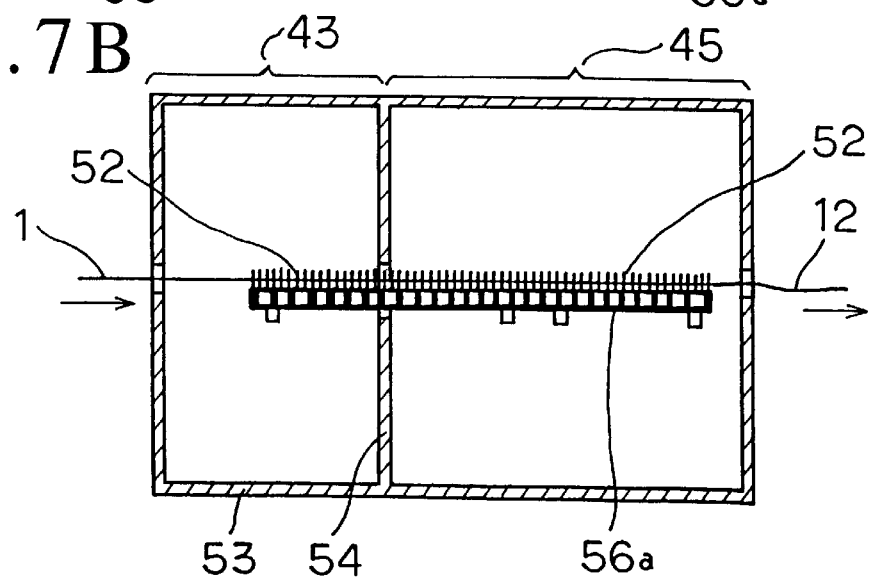
FIG. 7B is a diagram showing the interior of the transverse stretch apparatus shown in FIG. 7A, viewed from the side.

As shown in FIGS. 7A and 7B, in the transverse stretch apparatus of the embodiment, a pair of chains 56a, 56b running for transversely stretching original web 1 is disposed inside housing 53. The space in housing 53 is divided into two chambers, i.e., high temperature heating chamber 58 and low temperature heating chamber 59, by inner wall 54 extending perpendicularly to a horizontal direction. High temperature heating chamber 58 corresponds to a chamber of first transverse stretch unit 43 for performing preliminary stretch, while low temperature heating chamber 59 corresponds to a chamber of second transverse stretch unit 45 for performing main stretch.

Introduction port 55a is formed substantially at the center of the side wall facing inner wall 54 of the side wall forming high temperature heating chamber 58 of housing 53 for feeding original web 1 into high temperature heating chamber 58. Opening portion 54a is also formed in inner wall 54 for feeding original web 1 after the preliminary stretch in high temperature heating chamber 58 into low temperature heating chamber 59 from high temperature heating chamber 58. In addition, introduction port 55b is formed in the side wall facing inner wall 54 of the side walls forming low temperature heating chamber 59 of housing 53. Transversely stretched web 12 manufactured by performing the main stretch on original web 1 in low temperature heating chamber 59 is fed from the inside of low temperature heating chamber 59 to the outside thereof through introduction port 55b. Original web 1 is moved in one direction such that original web 1 passes through high temperature heating chamber 58 and low temperature heating chamber 59 in this order. Original web 1 is stretched in its width direction or transversely in high temperature heating chamber 58 and low temperature heating chamber 59.

The transverse stretch apparatus of the embodiment further comprises a heating unit serving as first heating means for heating original web 1 in high temperature heating chamber 58 to a temperature higher than its stretch suitable temperature by 5° C. or more, and a heating unit serving as second heating means for heating original web 1 in low temperature heating chamber 59 to its stretch suitable temperature. In such a transverse stretch apparatus, the section from the end on the side of introduction port 55a to inner wall 54 in the apparatus provides first transverse stretch unit 43 for performing the preliminary stretch on original web 1 at a temperature higher than the stretch suitable temperature of original web 1. The section from inner wall 54 to the end on the side of introduction port 55b provides second transverse stretch unit 45 for performing main stretch on original web 1 at the stretch suitable temperature.

Chains 56a, 56b are arranged perpendicularly to the moving direction of original web 1 and in parallel to original web 1, and both chains 56a and 56b run within one plane substantially parallel to original web 1. Chain 56a is stretched by chain wheel 57a disposed in high temperature heating chamber 58 and chain wheels 57b to 57d disposed in low temperature heating chamber 59. Chain 56b is stretched by chain wheel 57e disposed in high temperature heating chamber 58 and chain wheels 57f to 57h disposed in low temperature heating chamber 59.

Each of the portion between chain wheels 57a and 57b and the portion between chain wheels 57a and 57d in chain 56a, and the portion between chain wheels 57e and 57f and the portion between chain wheels 57e and 57h in chain 56b is inclined with respect to the moving direction of original web 1. Those portions in chains 56a, 56b are disposed within high temperature heating chamber 58 and low temperature heating chamber 59 through opening portion 54a in inner wall 54. The portion between chain wheels 57a and 57b in chain 56a and the portion between chain wheels 57e and 57f in chain 56b are opposed to each other such that the space between those portions is gradually increased downstream in the moving direction of original web 1.

On the other hand, the portion between chain wheels 57d and 57c in chain 56a and the portion between chain wheels 57h and 57g in chain 56b run along a direction substantially parallel to the moving direction of original web 1 such that those portions are opposed to each other. Thus, the portions in chains 56a, 56b except the end portions downstream in the moving direction of original web 1 runs obliquely with respect to the moving direction of original web 1 such that the space between chains 56a and 56b is gradually increased downstream in the moving direction of original web 1.

As shown in FIG. 7B, a plurality of pins 52 extending upward from the top surface of chain 56a are provided over the entire longitudinal direction of chain 56a. These pins 52 are provided for holding the edge portion of original web 1 on the side of chain 56a by penetrating the edge portion. Similarly, a plurality of pins extending upward from the top surface of chain 56b are provided over the entire longitudinal direction of chain 56b. These pins are provided for holding the edge portion of original web 1 on the side of chain 56b by penetrating the edge portion.

The pins each on chains 56a, 56b hold both edge portions of original web 1 in its width direction, and simultaneously, the running of chains 56a, 56b causes original web 1 to be moved. When original web 1 is moved by chains 56a, 56b in this manner, original web 1 is heated to a temperature higher than its stretch suitable temperature by 5° C. or more and stretched 1.2 to 3 times wider in the transverse direction with chains 56a, 56b in high temperature heating chamber 58 of first transverse stretch unit 43. In low temperature heating chamber 59 of second transverse stretch unit 45, original web 1 is further stretched transversely at the stretch suitable temperature with the inclined portions of chains 56a, 56b. Therefore, chains 56a, 56b, and the pins formed on the chains which hold both edge portions of original web 1 in first transverse stretch unit 43 constitute first stretch means for stretching original web 1, 1.2 to 3 times wider in the transverse direction. Chains 56a, 56b, and the pins formed on the chains which hold both edge portions of original web 1 in second transverse stretch unit 45 constitute second stretch means for further stretching transversely original web 1 to perform the main stretch. In this manner, original web 1 is transversely stretched by first transverse stretch unit 43 and second transverse stretch unit 45, thereby stretching original web 1, 7 times wider or more in the transverse direction in total as compared with the state before the stretch in first transverse stretch unit 43. These steps result in transversely stretched nonwoven fabric 12 made of original web 1 transversely stretched and having a tensile strength in the transverse direction of 132.5 mN/tex (1.5 g/d) or higher.

In the embodiment, the portion between chain wheels 57a and 57b in chain 56a, and the portion between chain wheels 57e and 57f in chain 56b extend linearly. However, a chain wheel other than the chain wheels shown in FIGS. 7A and 7B may be newly added to the transverse stretch apparatus for setting the stretch rate of original web 1 in second transverse stretch unit 45 at a predetermined value with respect to the stretch rate of original web 1 in first transverse stretch unit 43. Specifically, a chain wheel contacting the inner side or outer side of chain 56a is newly provided at a position near opening portion 54a between chain wheels 57a and 57d of chain 56a, and a chain wheel contacting the inner side or outer side of chain 56b is newly provided at a position near opening portion 54a between chain wheels 57e and 57h of chain 56b. These additional provisions allow setting of the ratio of the stretch rate in first transverse stretch unit 43 to the stretch rate in second transverse stretch unit 45 at a predetermined value.

While an apparatus for heating original web 1 is not shown in FIGS. 7A and 7B, original web 1 can be heated by hot air in the transverse stretch apparatus of the embodiment similarly to the first embodiment. As in the heating method used in first transverse stretch unit 23 of the first embodiment, hot air may be blown on original web 1 such that the hot air passes through original web 1 and the hot air is sucked through original web 1. Alternatively, as in the heating method used in second transverse stretch unit 25 of the first embodiment, hot air may be blown on original web 1 along the moving direction of original web 1. The method of passing hot air through original web 1 may be used in one of first transverse stretch unit 43 and second transverse stretch unit 45, and the method of blowing hot air along the moving direction of original web 1 may be used in the other. Alternatively, one of the methods of passing hot air through original web 1 and the method of blowing hot air along the moving direction of original web 1 may be used both in first transverse stretch unit 32 and in second transverse stretch unit 45.

In addition, in the transverse stretch apparatus of the embodiment, only one pair of chains 56a, 56b is used to provide first transverse stretch unit 43 for performing the preliminary stretch and second transverse stretch unit 45 for performing the main stretch. However, different pairs of chains may be used for the preliminary stretch and the main stretch, respectively. Specifically, chains 56a, 56b shown in FIG. 7A and chain wheels 57a to 57h for supporting the chains may be used for the preliminary stretch, and another pair of chains and another set of chain wheels may be used for the main stretch. Thus, two transverse stretch apparatuses of tenter frame with different stretch rates may be arranged along the moving direction of original web 1 to provide a transverse stretch apparatus for performing two-step stretch. In this case, the two-step transverse stretch apparatus is configured such that, of the two transverse stretch apparatuses of tenter frame, the stretch apparatus upstream in the moving direction of original web 1 is used for the preliminary stretch, and the stretch apparatus downstream in the moving direction is used for the main stretch.

Various nonwoven fabric can be used as original web 1 for use in manufacturing the transversely stretched nonwoven fabric in the present invention. Since original web 1 needs to realize both high strength of transversely stretched nonwoven fabric 12 obtained by stretching the web and a high stretch rate of original web 1, a nonwoven fabric which satisfies the following conditions is particularly desirable.

First, it is necessary that the diameter of the filaments constituting original web 1 is 30 μm or less, desirably 20 μm or less. Transversely stretched nonwoven fabric 12 in the present invention, which requires properties as a cloth in terms of its strength and texture, needs to be made of filaments with a diameter after stretch equal to or lower than 20 μm. To achieve this, the diameter of the filaments of original web 1 before stretch must be equal to or lower than 30 μm.

Second, original web 1 needs to be made of filaments with almost no molecular orientation. This is because filaments which already have molecular orientation are difficult to stretch further.

Thirdly, it is necessary that original web 1 is formed from filaments rapidly cooled at the spinning step and the filaments have a structure as close to amorphous as possible. This is because, if crystallization of the filaments progresses at the spinning step or later step, the crystal needs to be destroyed for stretching the filaments, resulting in susceptibility to stretch breaking of the filaments.

Fourthly, it is necessary that original web 1 is a nonwoven fabric with filaments aligned transversely and the filaments extend over both edges from one edge to the other edge in the width direction of original web 1. This is because such transverse alignment of the filaments is desirable to realize high strength and a high rate of a transversely stretched nonwoven fabric in typically used transverse stretch means which holds both edges of a web in its width direction (transverse direction). However, if the filaments do not extend over both edges from one edge to the other edge of original web 1, stretch of original web 1 after partial bonding, later described, can be applied.

The present invention intends to obtain a transversely stretched web of large width at high rate stretch. It is difficult for prior arts to increase a stretch rate in transversely stretching an original web, and the stretch rate is, even if increased, 5 to 6 at the maximum. As solving means for increasing the stretch rate, in the present invention, first, transverse stretch (preliminary stretch) is performed at a stretch rate of 1.2 or higher and 3 or lower at a temperature higher than a normal stretch suitable temperature by 5° C. or more, desirably 10° C. or more for polyethylene terephthalate (PET), and by 20° C. or more, desirably 40° C. or more for other polymer filaments such as polypropylene (PP). Thereafter, transverse stretch (main stretch) is performed in order to obtain strength of a nonwoven fabric after the temperature of the nonwoven fabric is reduced to the normal stretch suitable temperature. Such two-step transverse stretch consisting of the preliminary stretch and main stretch can easily realize stretch at a transverse stretch rate of 7 or more in total, specifically at a rate of 8 to 10, and can obtain a strength of the transversely stretched web after the stretch equal to or higher than that of normal stretch. The preliminary stretch in such high rate stretch is stretch in which the molecules of the filaments flow with no molecular orientation, i.e., flow stretch with almost no molecular orientation. In this preliminary stretch, the strength of the web is not increased yet. It is realized from the experimental results that a stretch rate of 1.2 or lower in the preliminary stretch does not lead to a high stretch rate in the main stretch, while a stretch rate of 3 or higher results in a reduction in the strength of the web.

Other Embodiments

As a method for allowing stretch at a high stretch rate besides the two-step transverse stretch method constituting the preliminary stretch and main stretch as described above, a method of manufacturing a stretch web particularly suitable for an original web un-oriented comprising filaments mainly made of PET was experimentally established. In the method, while an original web mainly made of PET was moved in a hot air temperature at 100° C. or higher, more desirably at 105° C. or higher, at a line speed of 20 m/min or higher, more desirably at 30 m/min, the original web was stretched 7 times wider or more in its transverse direction in total. This enabled manufacture of a transversely stretched web, as a transversely stretched web made of PET, at a transverse stretch rate of 7 or more in total and with a transverse tensile strength of 132.5 mN/tex (1.5 g/d) or higher. In the case of a temperature at which the original web is at 130° C. or higher, PET filaments were melted, and a transverse tensile strength of 132.5 mN/tex (1.5 g/d) or higher could not be obtained for the web.

When an original web has a small width, a plurality of original webs of small width are arranged in parallel such that two adjacent original webs are partially bonded to each other at the sides thereof in advance. In this manner, the plurality of original webs are formed into one sheet to constitute an original web of large width. The original web of large width formed from the partially bonded original webs is moved in one direction for transverse stretch. Such a method can provide both high strength of the original web from the partially bonded points in the original web of large width and large width of the original web before transverse stretch. In addition, it is also possible that a plurality of original webs are laminated one over another and the entire laminated original webs are partially bonded, thereby allowing an original web of large basis weight to be formed.

If attempts are made to perform the transverse stretch of a web at an industrial speed and to obtain a high rate and high strength, the temperature of the web is not increased due to delay of heating of the air contained in the web, and uniform heating of the web cannot be performed. Thus, as in two-step stretch apparatus 21 of the first embodiment, it is necessary to uniformly heat original web 1 to an intended stretch temperature before original web 1 is introduced into first transverse stretch unit 23 or second transverse stretch unit 25. With this heating, the temperature of the web can be increased to a uniform stretch temperature in first transverse stretch unit 23 or in second transverse stretch unit 25 by replacing the air contained in original web 1 with the air at a stretch temperature by hot air at the stretch temperature. A preheat unit which heats the web in this manner can realize stretch at a high rate and high strength. Means for replacing the air in the web allows the hot air to pass through the web when the web is carried by mesh web carrying means with air permeability. Such replacing means can replace the air contained in the web with the air at the stretch temperature.

The aforementioned carrying means include a mesh roll, a mesh conveyor belt, or the like. The hot air passing through the carrying means and the web may be hot air sucked by suction means disposed on the side of the carrying means, or hot air blown on the web from the side of the carrying means. It is essential only that the hot air passes through the web.

Various conventional transverse stretch apparatuses for webs can be used as a transverse stretch apparatus which can realize the transverse stretch of the present invention. Conventional web stretch means include a tenter frame for use as a transverse stretch apparatus for films, and means (U.S. Pat. No. 4,223,059) for transversely stretching webs between two combined groove rolls. In addition, a pulley type stretch method described in Japanese Patent Publication No. 36948/91 applied by the present applicant used in the first embodiment is effective.

For realizing the high rate stretch of the present invention, first, preliminary stretch is performed transversely at a high temperature and at a low stretch rate. Since the preliminary stretch is performed at a low rate, and the preliminary stretch requires no consideration of an increase in temperature to a stretch temperature if the aforementioned preheat unit is used, the transverse stretch unit for performing the preliminary stretch may be simple as one of means for realizing the high rate stretch of the present invention. As such a unit, a groove roll type stretch apparatus or a pulley type stretch unit is effective.

Also in the main stretch after the preliminary stretch, the pulley type stretch apparatus which is a simplified stretch apparatus and has favorable operability is particularly suitable as the transverse stretch apparatus.

While a stretch apparatus of tenter frame has disadvantages in that it is expensive and requires a large floor area, it has an advantage that a stretch temperature can be changed freely in a single stretch apparatus. Therefore, the tenter stretch apparatus can be utilized in the implementation of the present invention, and in such a case, an original web is preliminarily stretched at a high temperature in the initial stage of the stretch in the stretch apparatus, and then, the temperature of the original web is reduced to a stretch suitable temperature for stretch.

The provision of a heat treatment zone for performing heat treatment on an original web after stretch is effective to enhance the stability of the web. Normally, an effective heat treatment zone is provided such that heat treatment is performed on the original web with both edges thereof being held after transverse stretch is completed.

While the hot air is typically used for heating required in the stretch of the present invention as described above, another heat medium may be used in order to prevent oxidation or the like. Hot water and steam are effective for the heating of the web due to fast heat transfer.

The stretch temperature of the web in the stretch step is held constant by passing a heat medium through the web, or flowing the heat medium along the web.

While the present invention is directed basically to a transversely stretched nonwoven fabric and a method of manufacturing the same, a stretch rate of the web depends on kinds of polymers of filaments constituting the web, spinning means or aligning means for the web. However, a stretch rate is selected to allow a high degree of orientation and high strength of the web, which are the objects of the present invention, even with any kinds or means.

The stretch rate is derived with the following equation by using marks which are provided in the web before stretch at regular intervals in the stretch direction.

stretch rate=(inter-mark length after stretch)/(inter-mark length before stretch)

The stretch rate does not necessarily mean a stretch rate of each of the filaments as in typical stretch of long fiber filament yarn.

As polymer serving as a strength member suitable for filaments constituting the transversely stretched nonwoven fabric of the present invention, thermoplastic resins such as polyethylene, polypropylene, polyester, polyamide, polyvinyl chloride base resin, polyurethane, fluorocarbon resin, or any of the denatured resins thereof may be used. In addition, resins for wet or dry spinning means such as polyvinyl alcohol base resins, polyacrylonitrile resins or the like may be used.

The present invention can be used in mix spinning and conjugate spinning described in International Publication WO96/17121 by the present applicant, and the like.

Example 1

In Example 1, and Examples 2, 3, later described, the test results of material properties are shown only for a transverse direction according to a test method for a long fiber filament nonwoven fabric in JIS L1096. In JIS L1096, breaking strength is represented with a breaking load per 5 centimeters. The following description employs representation of strength per tex (mN/tex) with conversion from the weight of a nonwoven fabric to fineness (tex) since nonwoven fabrics of various basis weights were tested. For reference, strength per denier (d) is also shown.

In Example 1, polypropylene obtained by degradation was spun with the spinning apparatus described on the basis of FIG. 2 to FIG. 4 at an MFR (Melt Flow Rate) of 500 as a flow speed to form an original web with a width of 380 mm which was then transversely stretched. When original web 1 is transversely stretched, either two-step stretch apparatus 21 of the first embodiment or the transverse stretch apparatus of the tenter type of the second embodiment can be used. In transversely stretching the original web, each width of chuck portions at left and right edges of the original web was set at 40 mm. Thus, the distance between the chucks immediately before the stretch of the original web of 380 mm width was 300 mm. The transverse stretch was performed on the portion between the two chucks on both sides of the original web, i.e., the portion corresponding to the area of 300 mm width except the chuck portions in the original web before the stretch. The following examples also employ the 40 mm width for the chuck portions on left and right sides of the original web.

First, the aforementioned portions corresponding to the area of 300 mm width except the chuck portions in the original web of 380 mm width was transversely stretched at a preliminary stretch temperature of 135° C. and at a stretch rate of two for preliminary stretch in the manufacturing apparatus, thereby causing the original web to have a width of approximately 680 mm in total. Next, the original web of approximately 680 mm width was transversely stretched at a stretch temperature of 115° C. at a stretch rate of 5 for main stretch in the manufacturing apparatus, thereby obtaining a transversely stretched nonwoven fabric with a width of 2920 mm. The transverse stretch of the portion corresponding to the area of 600 mm width except the chuck portions in the original web of approximately 680 mm width at the main stretch rate of 5 resulted in the width 2920 mm of the portion of the transversely stretched nonwoven fabric, which is narrower than 3000 mm, because slight shrinkage was involved in the stretched portion. Those steps allowed the manufacture of the transversely stretched nonwoven fabric in strip shape at a total stretch rate of 10 in a transverse direction in the manufacturing apparatus, a tensile strength of 203.1 mN/tex (2.3 g/d) in the transverse direction, and a width of 2920 mm (due to the slight shrinkage).

Typically, a stretch suitable temperature for a nonwoven fabric made of rapidly cooled polypropylene is 90 to 100° C., and a maximum stretch rate for the polypropylene nonwoven fabric ranged from 5.5 to 6.0 in that temperature range.

Example 2

In Example 2, an original web with a width of 400 mm obtained by the spinning apparatus described on the basis of FIG. 2 to FIG. 4 was transversely stretched using a polyethylene telephthalate molten resin with a limiting viscosity of 0.52. First, the original web of 400 mm width was transversely stretched at a preliminary stretch temperature of 105° C. and at a stretch rate of 1.5 for preliminary stretch in the manufacturing apparatus. Thereafter, the original web was further stretched transversely at a main stretch temperature of 90° C. and at a stretch rate of 6 for main stretch in the manufacturing apparatus.

Since this example also employed a width of 40 mm for chuck portions on left and right sides of the original web as described in Example 1, the distance between the chucks immediately before the stretch was 320 mm, and the transverse stretch was performed on the portion corresponding to the area of 320 mm width except the chuck portions in the original web before the stretch. Thus, when the portion corresponding to the area of 320 mm except the chuck portions in the original web of 400 mm width was transversely stretched at the preliminary stretch rate of 1.5, the width of the resultant original web was approximately 560 mm in total. The portion corresponding to the area of 480 mm width except the chuck portions in the original web of 560 mm width was further stretched transversely at the main stretch rate of 6, thereby obtaining a transversely stretched nonwoven fabric with a width of approximately 2740 mm. Also in this case, the width of the transversely stretched nonwoven fabric was approximately 2740 mm narrower than 2880 mm by approximately 140 mm due to shrinkage of the stretched portion. The aforementioned steps resulted in the transversely stretched web, as a transversely stretched nonwoven fabric, with a total stretch rate of 9 in a transverse direction in the manufacturing apparatus, a tensile strength of 229.6 mN/tex (2.6 g/d) in the transverse direction, and a width of 2740 mm (due to the slight shrinkage).

Example 3

In Example 3, an original web with a width of 380 mm obtained by the spinning apparatus described on the basis of FIG. 2 to FIG. 4 was transversely stretched using a polyethylene telephthalate molten resin with a limiting viscosity of 0.56. Unlike the method of performing stretch in two steps as in Examples 1 and 2, this example employed preheat unit 22 and first transverse stretch unit 23 shown in FIG. 1 to transversely stretch the aforementioned original web of 380 mm width at a stretch rate changed to 9 in the unit, at a stretch temperature of 150° C., and a line speed of 45 m/min.

Since each width of chuck portions on left and right sides of the original web was set at 40 mm in this example as described in Example 1, the distance between the chucks immediately before the stretch was 300 mm, and the portion corresponding to the area of 300 mm width except the chuck portions in the original web before the stretch was transversely stretched at the stretch rate changed to 9 in the unit. In this manner, the portion corresponding to the area of 300 mm width except the chuck portions in the original web of 380 mm width was transversely stretched at the stretch rate of 9, thereby obtaining a transversely stretched nonwoven fabric with a width of approximately 2560 mm. Also in this case, the width of the transversely stretched nonwoven fabric was approximately 2560 mm narrower than 2700 mm by approximately 140 mm due to shrinkage of the stretched portion in the web. Such steps resulted in the transversely stretched web, as a transversely stretched nonwoven fabric, with a total stretch rate of 9 in the manufacturing apparatus, a tensile strength of 150.1 mN/tex (1.7 g/d) in the transverse direction, and a width of 2560 mm (due to the slight shrinkage).

While preferred embodiments of the present invention have been described using specific terms, such description is for illustrative purposes only, and it is to be understood that changes and variations may be made without departing from the spirit or scope of the following claims.

What is claimed is:

1. A method of manufacturing a transversely stretched nonwoven fabric, comprising the steps of:

stretching an original web comprising un-oriented filaments 1.2 to 3 times wider in a transverse direction of said original web at a temperature higher than its stretch suitable temperature by 5° C. or more;

further stretching said original web stretched 1.2 to 3 times wider in said transverse direction at said stretch suitable temperature such that the stretched fabric has a tensile strength of 132.5 mN/tex or higher in its transverse direction to stretch said original web 7 times wider or more in said transverse direction in total as compared with the state before the stretch thereof for manufacturing a transversely stretched nonwoven fabric comprising said filaments of said original web aligned transversely.

2. The method of manufacturing a transversely stretched nonwoven fabric according to claim 1, further comprising, before the step of stretching said original web 1.2 to 3 times wider in said transverse direction, the step of:

partially bonding said filaments forming said original web.

3. The method of manufacturing a transversely stretched nonwoven fabric according to claim 1, wherein an original web comprising filaments aligned in said transverse direction is used as said original web before the stretch in said transverse direction.

4. The method of manufacturing a transversely stretched nonwoven fabric according to claim 1, further comprising the steps of, in stretching said original web in said transverse direction:

disposing a pair of left and right pulleys with the same peripheral speed symmetrically about a center line such that the outer peripheries of said paired left and right pulleys have a gradually widening track;

circulating a pair of belts fitted to belt grooves formed on the peripheral surfaces of said paired left and right pulleys on said gradually widening track;

introducing said original web at a portion where the space between said paired left and right pulleys is narrow;

holding one edge portion of said original web in its transverse direction between the belt groove of one of said paired left and right pulleys and the belt fitted to said belt groove, and holding the other edge portion of said original web in its transverse direction between the belt groove of the other pulley and the belt fitted to said belt groove; and stretching said original web transversely on said gradually widening track formed by said paired left and right pulleys.

5. The method of manufacturing a transversely stretched nonwoven fabric according to claim 1, further comprising the steps of, in stretching said original web in said transverse direction:

using a transverse stretch apparatus of tenter frame of transversely stretching said original web by holding both edge portions of said original web in its transverse direction in one plane and pulling each of said both edge portions such that the distance between said both edge portions is increased.

* * * * *